United States Patent [19]

Nakajima et al.

[11] Patent Number: 4,652,536
[45] Date of Patent: Mar. 24, 1987

[54] TELLURITE GLASS

[75] Inventors: Toshitaka Nakajima; Hiroji Sagara, both of Tokyo, Japan

[73] Assignee: Hoya Corporation, Tokyo, Japan

[21] Appl. No.: 880,158

[22] Filed: Jun. 30, 1986

[30] Foreign Application Priority Data

Jun. 28, 1985 [JP] Japan ................................ 60-142071

[51] Int. Cl.$^4$ .............................................. C03C 3/12
[52] U.S. Cl. ..................................... 501/41; 501/900
[58] Field of Search ................................. 501/41, 900

[56] References Cited

U.S. PATENT DOCUMENTS

| | | | |
|---|---|---|---|
| 2,763,559 | 9/1956 | Weissenberg et al. | 501/41 |
| 3,291,620 | 12/1966 | Eustropjeu et al. | 501/41 |
| 3,661,600 | 5/1972 | Izumitani et al. | 501/41 |
| 3,690,908 | 9/1972 | Greco et al. | 501/41 |
| 3,845,406 | 10/1974 | Cooley | 501/41 |
| 3,855,545 | 12/1974 | Cooley | 501/41 |
| 4,312,660 | 1/1982 | Blair et al. | 501/41 |

*Primary Examiner*—Mark L. Bell
*Attorney, Agent, or Firm*—Cushman, Darby & Cushman

[57] ABSTRACT

Tellurite glass is disclosed, consisting essentially of 60 to 85 mol % of $TeO_2$, up to 25 mol % of $Li_2O$, up to 35 mol % of $Na_2O$, up to 25 mol % of $K_2O$, up to 25 mol % of $Rb_2O$, up to 15 mol % of $Cs_2O$, up to 10 mol % of MgO, up to 5 mol % of CaO, up to 5 mol % of SrO, 1 to 30 mol % of BaO, up to 30 mol % of ZnO, up to 30 mol % of PbO, and up to 5 mol % in total of $La_2O_3$, $ZrO_2$, $TiO_2$, $Nb_2O_5$, $Ta_2O_5$ and $WO_3$ with the total content of $K_2O$, $Rb_2O$ and $Cs_2O$ being from 1 to 25 mol %, and the total content of ZnO and PbO being from 1 to 30 mol %. The tellurite glass has a reduced light path difference with temperature difference and an increased figure of merit.

6 Claims, No Drawings

TELLURITE GLASS

FIELD OF THE INVENTION

This invention relates to tellurite glass and, more particularly, to tellurite glass useful as acoustic optical media for acoustic optics, such as light modulation and light deflection elements, etc., and various optical glasses, such as high-refraction glass, low-melting glass, etc.

BACKGROUND OF THE INVENTION

Conventional tellurite glass includes the following two types, which are useful as high-refraction, high-dispersion optical glass and a medium for acoustic optics:

(1) Tellurite glass consisting of 50 to 65 mol% of $TeO_2$, 20 to 30 mol% of $WO_3$ and 10 to 20 mol% of $Li_2O$ as basic glass formers; and one or more of 2 to 10 mol% of $K_2O$, 1 to 4 mol% of MgO, 1 to 6 mol% of BaO, 1 to 8 mol% of ZnO, 1 to 5 mol% of CdO, 1.5 to 6 mol% of $TiO_2$, 0.5 to 10 mol% of PbO, 0.5 to 5 mol% of $La_2O_3$, 1 to 6 mol% of $B_2O_3$, 1 to 6 mol% of $Nb_2O_5$ and 2 to 8 mol% of $Bi_2O_3$ to make 100 mol%, as described in Japanese Patent Publication No. 9083/73, hereinafter referred to as "Conventional Glass 1".

(2) Tellurite glass consisting of 60 to 75 mol% of $TeO_2$, 5 to 20 mol% of ZnO, 5 to 20 mol% in total of $Na_2O$ and $Li_2O$, up to 15 mol% of PbO, up to 16 mol% of BaO and up to 10 mol% of $La_2O_3$, as described in Japanese Patent Publication No. 28454/77, hereinafter referred to as "Conventional Glass 2".

Conventional Glass 1 is stable to devitrification and has improved chemical durability. Conventional Glass 2 has high figure of merit (Me value) and low ultrasonic absorbency.

In a typical application of tellurite glass, the acoustic optical modulation element is essentially composed of an acoustic optical medium made of tellurite glass in a block form, a transducer adhered on the upper side of the medium and a sound absorbing material placed beneath the lower side of the medium opposite to the transducer. In this element, a modulated signal is put into the transducer and converted to an ultrasonic signal. The ultrasonic signal is transmitted through the medium. On the other hand when a laser beam is entered from the side of the medium at a Bragg angle $\theta_B$ to the wave surface of the transmitting ultrasonic wave, the laser beam emerged from the medium includes not only 0-order ray that has transmitted in straight line but also first-order diffracted beam through an angle of $2\theta_B$ to the light path of the 0-order beam.

However, when Conventional Glass 1 or 2 is applied to such an acoustic optical medium for acoustic optics, the aforesaid first-order diffracted laser beam undergoes positional drift. The degree of the positional drift is usually from 0.1 to 0.15 mrad with an electric power applied to the transducer being 1 W. Such a drift is believed to be caused by a temperature increase of the transducer, adhesive layer and medium. Such an increase in temperature brings about change in refractive index of the medium, and it is considered that the degree of a positional drift depends on changes in optical pass due to changes in temperature (ds/dt) as represented by the following formula:

$$ds/dt = (dn/dt) + \alpha(n-1)$$

wherein dn/dt is a difference in refractive index (n) with a temperature difference; and $\alpha$ is an expansion coefficient.

SUMMARY OF THE INVENTION

This invention has been completed with the aim of elimination of the above-described problem, i.e., occurrence to a positional drift.

An object of this invention is to provide tellurite glass whose optical path has reduced temperature dependence.

Another object of this invention is to provide tellurite glass excellent in stability during melt production and durability.

A particular object of this invention is to provide tellurite glass having excellent properties required as a medium for light modulation and light deflection elements, such as a reduced optical path difference to temperature difference (ds/dt) and an increased figure of merit (Me).

As a result of extensive investigations to accomplish the above objects, it has now been found that BaO as an alkaline earth metal oxide component and $K_2O$, $Rb_2O$ and $Cs_2O$ as alkali metal oxide components, particularly $Rb_2O$ and $Cs_2O$, effectively function as modifying oxides particularly for reducing an optical path difference with temperature, ds/dt.

The present inventor has further discovered adequate proportions of these modifying oxides to tellurite glass having high figure of merit (Me) from the standpoint of acoustic opticical properties. The present invention has been reached based on these findings.

DETAILED DESCRIPTION OF THE INVENTION

The tellurite glass according to the present invention consists essentially of 60 to 85 mol%, and preferably 60 to 80 mol%, of $TeO_2$, up to 25 mol% (i.e., 0 to 25 mol%), and preferably up to 10 mol%, of $Li_2O$, up to 35 mol%, and preferably up to 10 mol%, of $Na_2O$, up to 25 mol%, and preferably up to 20 mol%, of $K_2O$, up to 25 mol%, and preferably up to 20 mol%, of $Rb_2O$, up to 15 mol%, and preferably up to 10 mol%, of $Cs_2O$, up to 10 mol%, and preferably up to 5 mol%, of MgO, up to 5 mol%, and preferably up to 2 mol%, of CaO, up to 5 mol%, and preferably up to 2 mol%, of SrO, 1 to 30 mol%, and preferably 1 to 20 mol%, of BaO, up to 30 mol%, and preferably up to 20 mol%, of ZnO, up to 30 mol%, and preferably up to 15 mol%, of PbO, and up to 5 mol%, and preferably up to 2 mol% in total of one or more of $La_2O_3$, $ZrO_2$, $TiO_2$, $Nb_2O_5$, $Ta_2O_5$ and $WO_3$, with the total content of $K_2O$, $Rb_2O$ and $Cs_2O$ being from 1 to 25 mol%, preferably from 1 to 20 mol%, and more preferably the total content of $Rb_2O$ and $Cs_2O$ being 1 to 20 mol%, and with the total content amount of ZnO and PbO being from 1 to 30 mol%, and preferably from 1 to 25 mol%. In the preparation of a glass molten batch, carbonates, nitrates, hydroxides and hydrates corresponding to the above-recited oxides can also be used.

Reasons for limitations on the tellurite glass composition of the present invention will be described below.

Larger contents of $TeO_2$ bring about favorable results, i.e., smaller ultrasonic absorption, greater refractive index and higher figure of merit. However, with the $TiO_2$ content exceeding 85 mol%, vitrification becomes unstable, showing a tendency of making ds/dt greater. Such being the case, it is difficult to reduce ds/dt even by incorporating the above-described modifying oxides. On the other hand, if the TeO$_2$ content is lower than 60 mol%, figure of merit (Me) becomes small. The TeO$_2$ content is, therefore, limited to a range of from 60 to 85 mol%, and preferably from 60 to 80 mol%.

Li$_2$O, Na$_2$O, K$_2$O, Rb$_2$O and Cs$_2$O each functions to stabilize vitrification and to lower a devitrification temperature. Since too large contents of these components fail to exert expected effects, the Li$_2$O content is limited up to 25 mol%, and preferably up to 10 mol%; the Na$_2$O content up to 35 mol%, and preferably up to 10 mol%; the K$_2$O content up to 25 mol%, and preferably up to 20 mol%; the Rb$_2$O content up to 25 mol%, and preferably up to 20 mol%; and the Cs$_2$O content up to 15 mol%, and preferably up to 10 mol%, respectively. Further, if the total content of K$_2$O, Rb$_2$O and CS$_2$O is less than 1 mol%, the effect to decrease ds/dt cannot be obtained. If it exceeds 25 mol%, vitrification becomes unstable. Accordingly, the total content of these components is limited to a range of from 1 to 25 mol%, preferably from 1 to 20 mol%, and more preferably the total content of Rb$_2$O and Cs$_2$O is from 1 to 20 mol%.

MgO, CaO, SrO and BaO each functions to stabilize vitrification and to improve water resistance without so lowering a refractive index as alkali components. Taking first consideration of resistance to devitrification, the MgO content is limited to up to 10 mol%, and preferably up to 5 mol%; the CaO content up to 5 mol%, and preferably up to 2 mol%; and the SrO content up to 5 mol%, and preferably up to 2 mol%, respectively. In addition to the above-described activities, BaO is an essential component for decreasing ds/dt, and its content is limited to a range of from 1 to 30 mol%, and preferably from 1 to 20 mol%. The BaO content of less than 1 mol% cannot produce such an effect.

ZnO and/or PbO is/are effective to improve water resistance and resistance to devitrification, but too large content of each makes vitrification unstable. Accordingly, the ZnO content is limited up to 30 mol%, and preferably up to 20 mol%, and the PbO content is limited up to 30 mol%, and preferably up to 15 mol%, with the total content of ZnO and PbO falling within a range of from 1 to 30 mol%, and preferably from 1 to 25 mol%.

Each of La$_2$O$_3$, ZrO$_2$, TiO$_2$, Nb$_2$O$_5$, Ta$_2$O$_5$ and WO$_3$ is effective to improve water resistance and to heighten hardness. However, too large content thereof not only causes unstable vitrification but makes the glass composition sparingly fusible and, in addition, shows a tendency to increase ds/dt. It is difficult to decrease such an increased ds/dt even by incorporating the aforesaid modifying oxides. Taking all these considerations into account, the total content of these components is limited up to 5 mol%, and preferably up to 2 mol%.

This invention will now be illustrated in greater detail with reference to the following examples, but it should be understood that they are not intended to limit the present invention.

EXAMPLES 1 TO 5 AND COMPARATIVE EXAMPLES 1 TO 2

Tellurite glass according to the present invention (Examples 1 to 5) and Conventional Glass 1 and 2 having compositions shown in Table below were prepared as follows.

A batch of raw materials having the respective composition was melted in a metal-made crucible at a temperature of from 600° to 800° C., and the molten glass was stirred to completely defoam. The clear molten glass was then casted, followed by allowing to gradually cool. The thus prepared tellurite glass was processed and polished in a disc specimen of 15 mm in diameter and 5 mm in thickness. While heating the specimen from 20° to 40° C. at a temperature increase rate of about 1° C./min, a refractive index (n) was measured by means of a precision spectrometer, and a coefficient of thermal expansion ($\alpha$) was measured by means of an interference dilatometer. ds/dt was obtained from these results in accordance with the above-mentioned formula. Further, the tellurite glass was processed in an acoustic optical medium haivng a block form, and an acoustic optical modulation element was produced using the medium as described before. The figure of merit (Me) of the resulting element was determined according to a Dixon-Cohen method as described R. W. Dixon and M. G. Cohen, *Appl. Phys. Lett.*, vol. 8, 205–207(1966). The results obtained are shown in Table below.

TABLE

| Composition | Example No. 1 | 2 | 3 | 4 | 5 | Comparative Example No. 1 | 2 |
|---|---|---|---|---|---|---|---|
| TeO$_2$ (mol %) | 75 | 75 | 75 | 80 | 75 | 55 | 70 |
| K$_2$O (mol %) | 8 | — | — | — | — | — | — |
| Rb$_2$O (mol %) | — | 6 | — | — | — | — | — |
| Cs$_2$O (mol %) | — | — | 4 | 8 | 5 | — | — |
| BaO (mol %) | 5 | 5 | 5 | 2 | 5 | — | — |
| ZnO (mol %) | 12 | 14 | 16 | — | 9 | — | 15 |
| PbO (mol %) | — | — | — | 10 | — | 4 | — |
| Li$_2$O (mol %) | — | — | — | — | — | 16 | — |
| Na$_2$O (mol %) | — | — | — | — | 3 | — | 13 |
| CaO (mol %) | — | — | — | — | 1 | — | — |
| La$_2$O$_3$ (mol %) | — | — | — | — | 2 | — | 2 |
| WO$_3$ (mol %) | — | — | — | — | — | 25 | — |
| ds/dt ($\times 10^{-6}$/°C.) 20–40° C. | −0.4 | −0.9 | −0.8 | −1.0 | −0.3 | +10.4 | +11.3 |
| Me ($\times 10^{-18}$ sec$^3$/g) | 21.0 | 21.4 | 21.5 | 22.0 | 21.7 | 24.0 | 20.0 |

As is obvious from the results of Table above, the tellurite glass according to the present invention shows ds/dt decreased to less than 1/10 that of the conventional glass, i.e., an absolute ds/dt value of 1 or less, while keeping level with the Me value of the conventional glass.

As additional data of optical characteristics, the tellurite glass according to the present invention had a refractive index of from 1.9 to 2.2 and a sag point of from 280° to 330° C.

The tellurite glass of the present invention can be applied not only to the above-described acoustic optical modulation elements but acoustic optical deflection elements as well as to various optical glass, with full advantage of its characteristics.

As described above, the tellurite glass of this invention has a reduced light path difference with temperature difference, ds/dt, while retaining a satisfactory figure of merit, Me, and has, therefore, a great practical value particularly to acoustic optical media for acoustic optics as well as to various optical glass.

While the invention has been described in detail and with reference to specific embodiments thereof, it will be apparent to one skilled in the art that various changes and modifications can be made therein without departing from the spirit and scope thereof.

What is claimed is:

1. Tellurite glass consisting essentially of 60 to 85 mol% of $TeO_2$, up to 25 mol% of $Li_2O$, up to 35 mol% of $Na_2O$, up to 25 mol% of $K_2O$, up to 25 mol% of $Rb_2O$, up to 15 mol% of $Cs_2O$, up to 10 mol% of MgO, up to 5 mol% of CaO, up to 5 mol% of SrO, 1 to 30 mol% of BaO, up to 30 mol% of ZnO, up to 30 mol% of PbO, and up to 5 mol% in total of one or more of $La_2O_3$, $ZrO_2$, $TiO_2$, $Nb_2O_5$, $Ta_2O_5$ and $WO_3$, with the total content of $K_2O$, $Rb_2O$ and $Cs_2O$ being from 1 to 25 mol%, and the total content of ZnO and PbO being from 1 to 30 mol%.

2. Tellurite glass as in claim 1, wherein said glass comprises 60 to 80 mol% of $TeO_2$, up to 10 mol% of $Li_2O$, up to 10 mol% of $Na_2O$, up to 20 mol% of $K_2O$, up to 20 mol% of $Rb_2O$, up to 10 mol% of $Cs_2O$, up to 5 mol% of MgO, up to 2 mol% of CaO, up to 2 mol% of SrO, 1 to 20 mol% of BaO, up to 20 mol% of ZnO, up to 15 mol% of PbO, and up to 2 mol% in total of one or more of $La_2O_3$, $ZrO_2$, $TiO_2$, $Nb_2O_5$, $Ta_2O_5$ and $WO_3$, with the total content of $K_2O$, $Rb_2O$ and $Cs_2O$ being 1 to 20 mol%, and the total content of ZnO and PbO being 1 to 25 mol%.

3. Tellurite glass as in claim 1, wherein the total content of $Rb_2O$ and $Cs_2O$ is from 1 to 20 mol%.

4. Tellurite glass as claimed in claim 1, wherein an absolute value of a light path difference with temperature difference, ds/dt, ($\times 10^{-6}/°C.$) is 1 or less.

5. Tellurite glass as claimed in claim 2, wherein an absolute value of a light path difference with temperature difference, ds/dt, ($\times 10^{-6}/°C.$) is 1 or less.

6. Tellurite glass as claimed in claim 3, wherein an absolute value of a light path difference with temperature difference, ds/dt, ($\times 10^{-6}/°C.$) is 1 or less.

* * * * *